(12) United States Patent
Hesse (10) Patent No.: US 10,178,209 B1
(45) Date of Patent: Jan. 8, 2019

(54) ACCESSORY MOUNT FOR SMARTPHONES, TABLETS, IPADS, AND CAMERAS

(71) Applicant: Andrew Hesse, Jamestown, CA (US)

(72) Inventor: Andrew Hesse, Jamestown, CA (US)

( * ) Notice: Subject to any disclaimer, the term of this patent is extended or adjusted under 35 U.S.C. 154(b) by 0 days.

(21) Appl. No.: 15/826,249

(22) Filed: Nov. 29, 2017

(51) Int. Cl.
| | |
|---|---|
| *H04M 1/00* | (2006.01) |
| *H04M 1/04* | (2006.01) |
| *H04N 5/225* | (2006.01) |
| *F16M 11/14* | (2006.01) |
| *F16M 13/02* | (2006.01) |
| *G03B 17/56* | (2006.01) |
| *F16M 11/20* | (2006.01) |

(52) U.S. Cl.
CPC ............. *H04M 1/04* (2013.01); *F16M 11/14* (2013.01); *F16M 11/2021* (2013.01); *F16M 13/022* (2013.01); *G03B 17/561* (2013.01); *H04N 5/2253* (2013.01); *F16M 2200/024* (2013.01)

(58) Field of Classification Search
CPC ...... F16M 11/14; F16M 11/041; F16M 13/00; F16M 11/2078; F16M 2200/022; F16M 11/046; F16M 11/105; F16M 13/022; F16M 11/28; F16M 11/08; F16M 11/242; F16M 13/02; F16M 11/24; F16M 13/04; F16M 11/40; F16M 11/16; F16M 11/22
USPC ...................................................... 455/575.1
See application file for complete search history.

(56) References Cited

U.S. PATENT DOCUMENTS

| | | | | |
|---|---|---|---|---|
| 6,672,788 | B2 * | 1/2004 | Hathaway | F16C 11/0619 403/132 |
| 7,551,225 | B2 * | 6/2009 | Overstreet | F16M 11/041 248/187.1 |
| 7,631,842 | B2 * | 12/2009 | Crain | F16B 7/1463 248/165 |
| 2015/0094156 | A1 * | 4/2015 | Cordell | B25G 1/04 464/51 |
| 2015/0358044 | A1 * | 12/2015 | Barstead | H04B 1/3888 455/575.1 |

* cited by examiner

*Primary Examiner* — Ajibola A Akinyemi
(74) *Attorney, Agent, or Firm* — Dale Jensen, PLC; Dale Jensen (57) ABSTRACT

A mounting device to support and secure a mobile device incorporating a high pixel count camera, comprised of a first rod secured to a support plate, with the first rod connected to a ball and socket joint for rotating the mounting device into at least a 90° configuration, the ball and socket joint connected to a second rod interposed between the ball and socket joint and a pivot mechanism comprising a pivot dial facilitating pivoting around a vertical axis, and terminating in a vice clamp opposed to the support plate, with a third rod interposed between the pivot mechanism and the vice clamp. A removable mount receives a mobile device having an integrated high pixel count camera and camera lens, the removable mount securing the mobile device so as to leave the camera lens unobstructed.

10 Claims, 9 Drawing Sheets

ACCESSORY MOUNT FOR SMARTPHONES, TABLETS, IPADS, AND CAMERAS

CROSS-REFERENCE TO RELATED APPLICATION(S)

Not applicable

BACKGROUND OF THE INVENTION

1. Field of Invention

The present invention relates to the field of mounting devices, more particularly to a mounting device for supporting a smartphone, tablet, iPad, or camera.

2. Description of Related Art

Increasingly, smartphones and similar mobile devices have supplemented and often times entirely replaced conventional cameras. The optic ability of these conventional camera replacements continue to improve. However, even as the quality of the digital images captured by these mobile devices has approached and in certain aspects even surpassed cameras, the accessories and ancillary equipment (e.g., tripods, mounts, supports, etc.) available to camera photography continues to far outstrip comparable equipment for mobile devices.

Various mounting/support devices are available for cameras to facilitate copy work, flat, or 3D photography. One cannot find similar devices for mobile devices such as smartphones and tablets to support these uses.

Based on the foregoing, there is a need in the art a mounting and support system, which will facilitate a variety of photographic activities to include copy work, flat, or 3D photography using mobile devices.

SUMMARY OF THE INVENTION

A mounting device to support and secure a mobile device incorporating a high pixel count camera, comprised of a first rod secured to a support plate, with the first rod connected to a ball and socket joint for rotating the mounting device into at least a 90° configuration, the ball and socket joint connected to a second rod interposed between the ball and socket joint and a pivot mechanism comprising a pivot dial facilitating pivoting around a vertical axis, and terminating in a vice clamp opposed to the support plate, with a third rod interposed between the pivot mechanism and the vice clamp. A removable mount receives a mobile device having an integrated high pixel count camera and camera lens, the removable mount securing the mobile device so as to leave the camera lens unobstructed.

The second rod further comprises a telescoping inner rod.

The second rod further comprises a telescoping inner rod housing a telescoping brace rod for bracing the mounting device when the ball and socket joint is rotated from a 0° vertical configuration, the telescoping brace rod rotating outward for use.

The ball and socket joint facilitates a 90° configuration of the mounting device.

A hinge joint on the third rod interposed between pivot mechanism and the vice clamp, and the hinge joint facilitates rotating the mounting device up to 90° and further comprises a locking lever and a hinge stop.

The telescoping brace rod further comprises a pivot joint at a first end proximate to the ball and socket joint secured to the interior of telescoping inner rod, and a rubber tip at a second end, and the rubber tip fits into at least one slot in the second rod to brace the mounting device when in a 90° configuration.

The ball and socket joint further comprises a spring-loaded ball bearing and dimple for aligning the mounting device in a 90° configuration.

The third rod interior is configured to accommodate a hinge joint located at a distal end of the telescoping inner rod when in a retracted configuration, wherein the telescoping inner rod in an extended configuration can extend outward from the second rod to rotate on then exposed hinge joint to configure the mounting device in a 90° configuration.

The telescoping brace rod fits into the telescoping inner rod in a retracted configuration, with the hinge joint fitting inside the telescoping inner rod.

The removable mount comprises a flat surface at least partially covered by a hook portion of a hook-and-loop fastener, and a felt-covered shelf bottom supports the mobile device.

The invention discloses a mounting device for a mobile device, such as a smartphone, tablet, or camera (e.g., SLR), that can support a number of photograph activities. The mounting device includes a removable mounting surface having a shelf and Velcro for supporting the mobile device, a hinged, telescoping arm with ball and socket locking mechanism and support rod, rotary pivot dial for adjusting the telescoping neck, and base portion including a vice clamp and slot opening for tripod mount attachment. The mounting device may be used for photography or viewing, standalone or in conjunction with a tripod. The entire mounting device may be attached a tripod, or attached in part with a detachable mount piece that can accommodate various mobile devices. The mounting device can be used for long-distance selfies with the use of a time-delay shutter, or can be used for copy work, flat, or 3D photography. The mounting device can be attached to a table, chair, or tripod. Unlike related devices with clamps, clips, or other moving parts, the mounting device does not obscure the screen of the mobile device. The mounting accessory can set various angles.

Advantages:
1. Improved utility/multi-functionality.
2. Universal to mobile devices of different sizes
3. Does not obscure viewing screen of mobile device.
4. Improved convenience.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-16, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

Figure 1:
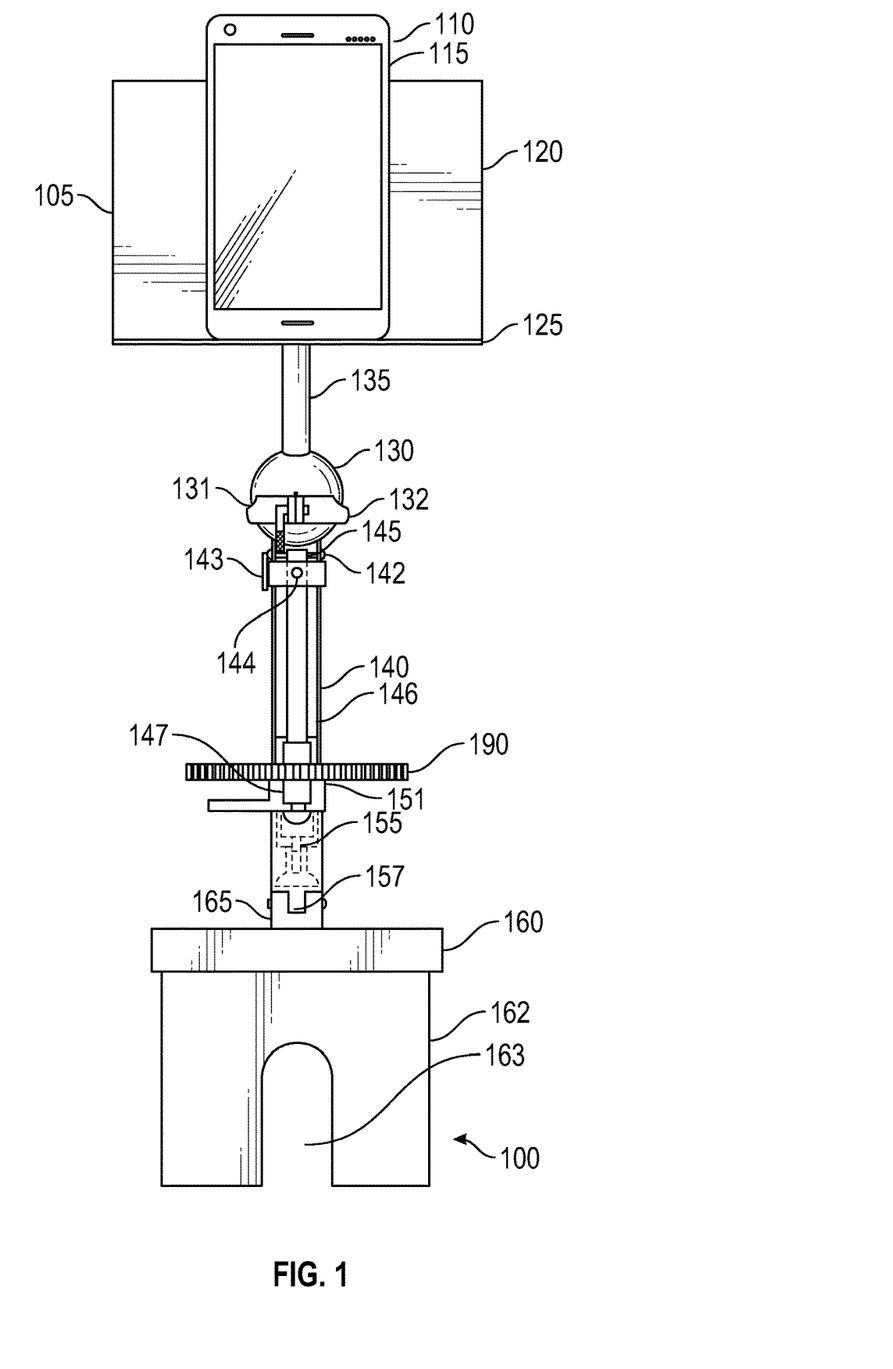
FIG. 1 is a front view of the mounting device, according to an embodiment of the present invention.

FIG. 1 shows an embodiment of a front view of the mounting device 100 in accord with the inventions. Mounting device 100 as depicted is configured in a vertical, upright orientation. A removable mount 105 can comprise the top of mounting device 100 and can facilitate attaching a mobile device such as a smartphone, tablet, iPad, or similar device incorporating a digital camera. A dedicated digital camera, including a video camera, can also be attached. The removable mount 105 can also facilitate the use of a remote shutter activator or time delay setting. As depicted, a smartphone 110 can be supported by removable mount 105 with a lens on the back side of the smartphone 110 left unobstructed. A screen 115 on the smartphone 110 can be held in place so as to leave screen 115 unobstructed as well for viewing multimedia content or supporting camera photography functions of the smartphone 110.

Removable mount 105 can also include the hook half of a hook-and-loop fastener (e.g., Velcro®) firmly attached (e.g., glued) to a support bracket 120. In turn, the mobile device such as smartphone 110 can have the matching loop half of the hook-and-loop fastener to securely hold the mobile device in place on the support bracket 120. Further, the support bracket 120 can include a felt-covered shelf 125 forming the bottom of support bracket 120.

Below the removable mount 105, the mounting device 100 can include a ball and socket joint 130 for manipulating and orientating mounting device 100. The ball and socket joint 130 can include a locking ring 131 in the socket for locking the ball and socket joint 130 in place and which includes a notch. The ball and socket joint 130 can further include a spring-loaded ball bearing at the base of the socket and a dimple on the bottom of the ball for automatically aligning the ball and socket joint 130 to impart and set a 90° orientation of the mounting device 100. A screw locking key or lever 132 can be used to selectively lock and unlock the ball and socket joint 130. A round rod 135 extends between the removable mount 105 and ball and socket joint 130 and which fits into and through the notch in the locking ring 131.

A square outer rod 140 can extend upward from a pivot dial 150, with the square outer rod 140 terminating in a locking collar 141. The square outer rod 140 can accommodate the insertion and housing of a telescoping inner square rod 145, with hinge pin 142 acting as a stop to halt insertion of telescoping inner rod 145 into square outer rod 140. Locking collar 141 can be used to lock the relative positions of the square outer rod 140 and telescoping inner square rod 145 in place, and locking lever 143 can lock or release locking collar 141. Counter sunk screw 144 serves as stop to engage with hinge joint 156 and prevent the telescoping inner square rod 145 from being fully withdrawn. Telescoping round brace rod 146 fits inside telescoping inner square rod 145 and can be rotated to extend outward to provide bracing support when mounting device is configured at 90°.

Pivot dial 150 can allow pivoting the mounting device 100 around its vertical axis. While everything above pivot dial 150 can pivot, everything below the pivot dial 150 can remain stationary. A locking lever 151 can be used to lock pivot dial 150 in place, and the locking lever 151 can be threaded to facilitate locking pivot dial 150 in place, and locking lever 151 operates a magnetized twist lock 147 inside locking lever 151. A round stationary rod 155 can support the pivot dial 150 and can include housing the telescoping inner square rod 145, which can terminate in a hinge joint 156 on the end.

Telescoping inner square rod 145 can connect to the ball and socket joint 130 and can fit into square outer rod 140 to connect to pivot dial 150. Pivot dial 150 can fit onto stationary round rod 155, which can also house the lower end of telescoping inner square rod 145. Stationary round rod 155 can terminate in a hinge 165 that rotate within a 90° arc connected to base 160 by a square terminus 157 forming a pivot.

Base 160 can comprise a vice clamp 162 on its lower end. Vice clamp 162 can include a "U"-shaped slot 163 for connecting to a tripod. A hinge joint 165 can be interposed between the stationary round rod 155 and base 160 and can include a locking lever 166 for locking hinge joint 165 in place.

Figure 2:
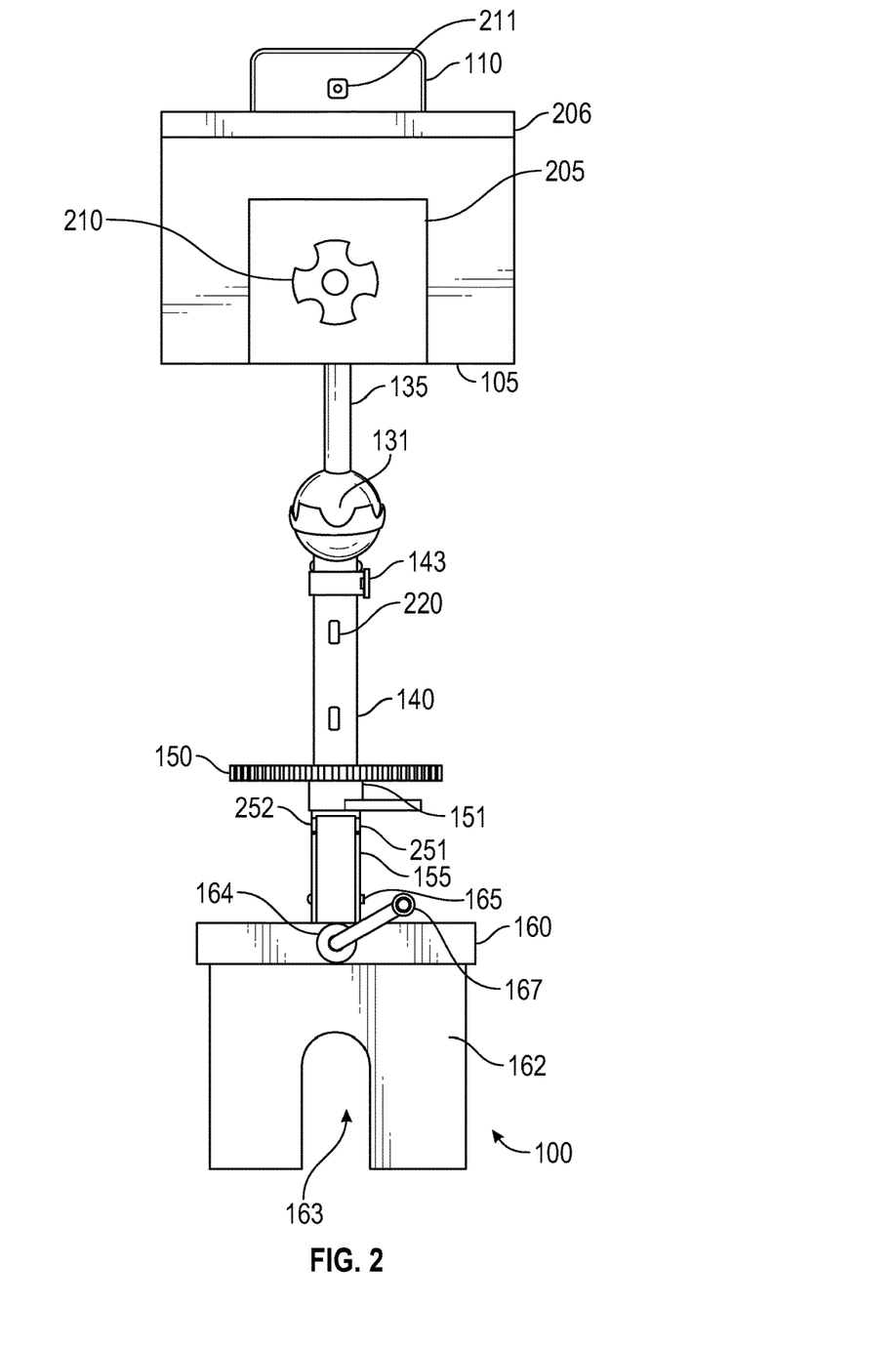
FIG. 2 is a back view of the mounting device, according to an embodiment of the present invention.

FIG. 2 depicts a back view of the mounting device 100 of FIG. 1. Removable mount 105 can support mobile device 110, which can comprise a smartphone with a camera lens 211. The removable mount 105 can include a handle 206. Removable mount 105 can removably attach to a stationary support plate 205 structurally incorporated in mounting device 100, and locking dial 210 can be used to fasten removable mount 105 in place. Round rod 135 can connect support plate 205 to ball and socket joint 130. Ball and socket joint 130 can include locking ring notch 131. A square outer rod 140 can extend down from ball and socket joint 130. A locking lever 143 can be used to lock locking collar 141 in place. Square outer rod 140 can also include a pair of slots 220 to support a telescoping round rod fitting inside telescoping inner square rod 145.

Figure 3:
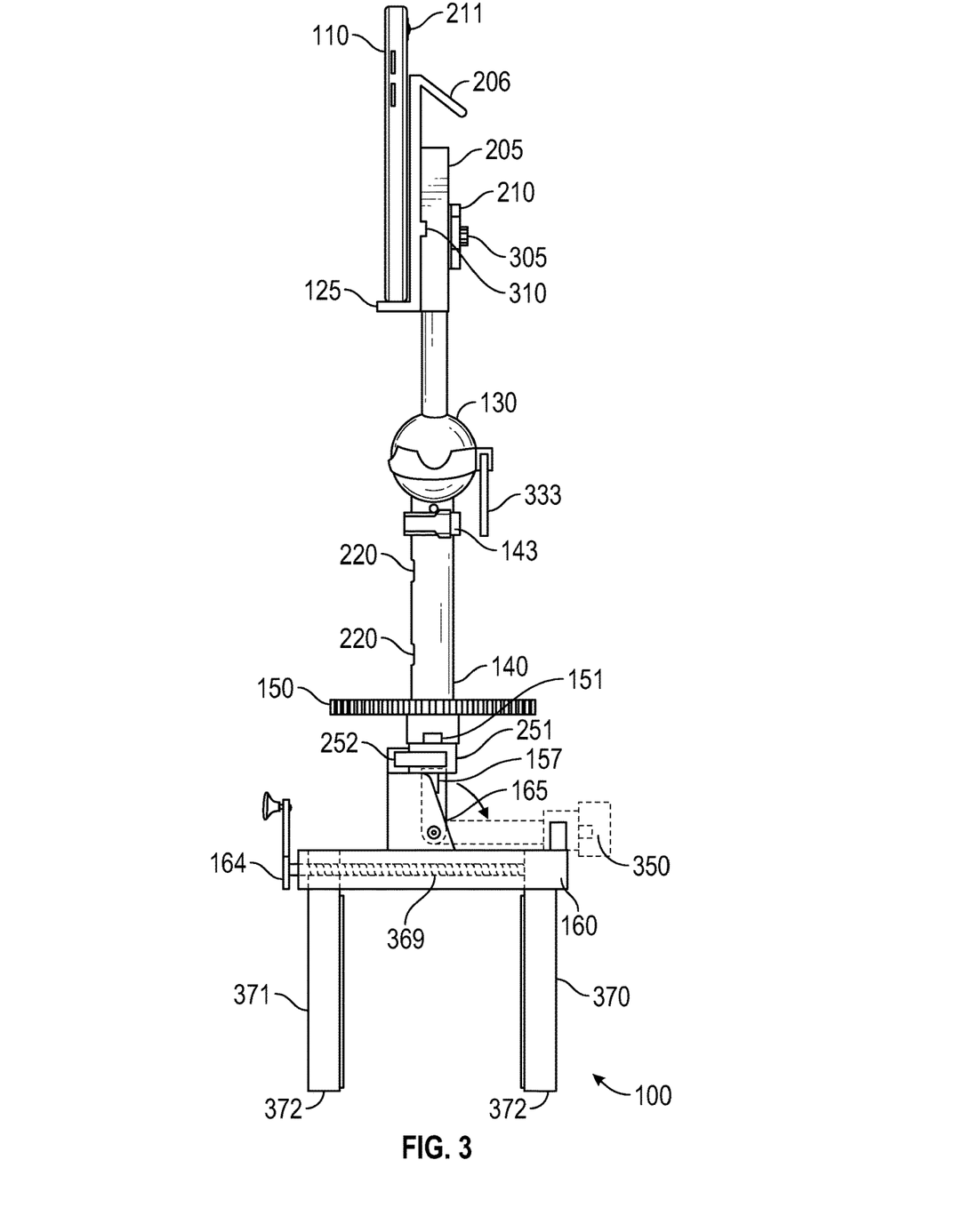
FIG. 3 is a left side view of the mounting device, according to an embodiment of the present invention.

Pivot dial 150 facilitates pivoting the mounting device 100 around its vertical axis. Locking lever 151 can be threaded to lock pivot dial 150 in place. Round stationary rod 155 can be interposed between pivot dial 150 and hinge joint 165, which can be locked using locking lever 166. Pivot dial 150 can facilitate pivoting on top of round stationary rod 155. Telescoping inner square rod 145 can connect to the ball and socket joint 130 and can fit into square outer rod 140 to connect to pivot dial 150. Pivot dial 150 can fit onto stationary round rod 155, which can also house the lower end of telescoping inner square rod 145. Round stationary rod 155 can terminate in a hinge 165 that rotate within a 90° arc. Stationary round rod 155 can be locked vertically using round locking collar 251 and spring clip 252 can be used to secure round locking collar 251 in place. Hinge joint 165 can be attached to base 160, which can include vice clamp 162. Crank 164 can operate clamp 162 and can include a swivel knob 167. Vice clamp 162 can include a "U"-shaped slot 163 for connecting to a tripod FIG. 3 depicts a left side view of the mounting device 100 of FIG. 1. As depicted, mobile device 110 can be mounted on removable mount 105 resting on shelf 125. Mobile device can have an integrated high pixel count camera with the lens 211 unobscured by the removable mount 105. A handle 206 on removable mount 105 can facilitate carrying and manipulating removable mount 105. Stationary mounting plate 205 can receive and attach to removable mount 105 using locking dial 210 to rotate holding bolt 305 to screw into a receiving threaded recess (not shown) and secure removable mount 105.

Round rod 135 can connect stationary mounting plate 205 to ball and socket joint 130. A quick release lever 333 can operate to release and lock ball and socket joint 130 in place. Telescoping inner square rod 145 can connect to the ball and socket joint 130 and can fit into square outer rod 140 to connect to pivot dial 150. Square outer rod 140 can include two slots 220 to receive a telescoping round rod fitting inside telescoping inner square rod 145. Pivot dial 150 can fit onto stationary round rod 155, which can also house the lower end of telescoping inner square rod 145. Stationary round rod 155 can be locked vertically using round locking collar 251 and spring clip 252 can be used to secure round locking collar 251 in place. Stationary round rod 155 can terminate in a hinge 165 that rotate within a 90° arc connected to base 160 by a square terminus 157 forming a pivot. Spring clips 350 can receive stationary round rod 155 when rotated into a 90° configuration. Crank 164 can operate clamp 162. Stationary vice clamp 370 can remain stationary while moveable vice clamp 371 can be moved in response to crank 164 rotating jack screw 369. Padding on vice clamps 370 and 371 can protect the surface of objects to which mounting device 100 can be attached.

Figure 4:
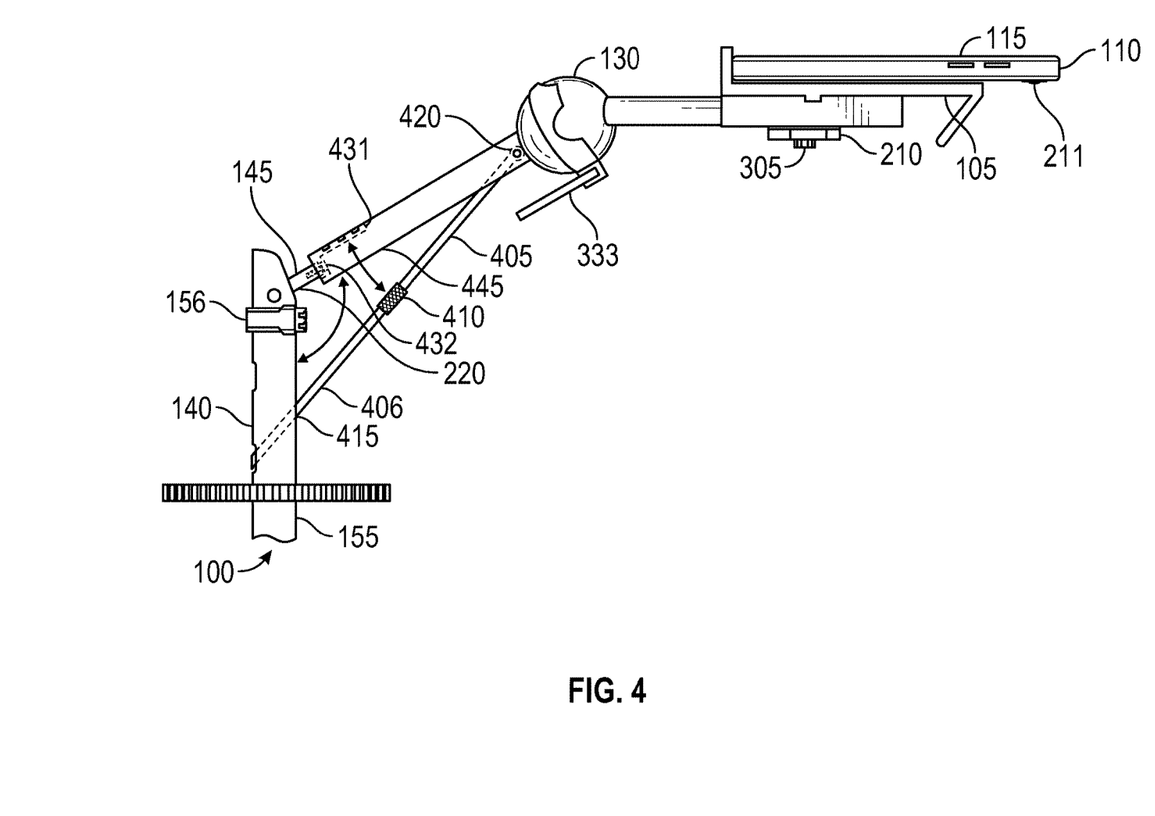
FIG. 4 is a left side view of the mounting device configured in a 90° orientation with the lens pointed downward, according to an embodiment of the present invention.

FIG. 4 is a left side view of the mounting device 100 configured in a 90° orientation with the lens pointed downward. Mobile device 110 can be mounted on removable mount 105 resting on shelf 125, with screen 115 left totally unobscured. Mobile device 110 can have an integrated high pixel count camera with the lens 211 unobscured by the removable mount 105. Stationary mounting plate 205 can receive and attach securely to removable mount 105 using locking dial 210 to rotate holding bolt 305 to screw into a receiving threaded recess (not shown) and secure removable mount 105.

Round rod 135 can connect stationary mounting plate 205 to ball and socket joint 130. Ball and socket joint 130 can be operated by quick release lever 333. Telescoping inner square rod 145 can connect to the ball and socket joint 130 and can fit into square outer rod 140 to connect to pivot dial 150. Telescoping inner square rod 145 can house a hinge joint 420 facilitating the rotation of a telescoping brace rod 405, which fits inside of and is housed inside telescoping inner square rod 145, out of telescoping inner square rod 145. The telescoping brace rod 405 can be made from steel and include a magnetized twist lock 410 at an interface of the two parts of the telescoping brace rod 405 to lock the telescoping brace rod 405 at a desired length. Hinge 420 can be made from aluminum. The distal end 406 of the telescoping brace rod 405 telescopes in and out at the twist lock 410. The end of the distal end 406 terminates in a rubber tip 415. Rubber tip 415 can through slots 220 to rest inside square outer rod 140 to support the mounting device in a desired orientation; 90° as depicted.

In an embodiment, the telescoping inner square rod 145 can pivot on hinge joint 156 to provide a 90° configuration for the mounting device. Hinge joint 156 can made from steel and can be extended upward on telescoping inner square rod 145 by sliding upward from within square outer rod 140 where it is housed. Hinge joint 156 can include an angled cutout to accommodate rotating telescoping inner square rod 145 up to 90°. The interior of square outer rod 140 can be configured to accommodate and house hinge joint 156, which can be located at the distal end of the telescoping brace rod 405, when in a retracted configuration. As can be readily appreciated, other angular configurations for mounting device 100 besides 90° can be easily obtained using the ball and socket joint 130 and varying the length of telescoping brace rod 405 and using the two slots 220. Furthermore, as readily apparent, round stationary rod 155 can accommodate hinge joint 156 and telescoping brace rod 405 in its interior when in a contracted configuration. The interior of at the telescoping inner square rod 145 at the connection to hinge joint 156 can include a steel mounting bracket 431 secured to the telescoping inner square rod 145 and hinge joint 156 by countersunk screws 432.

Figure 5:
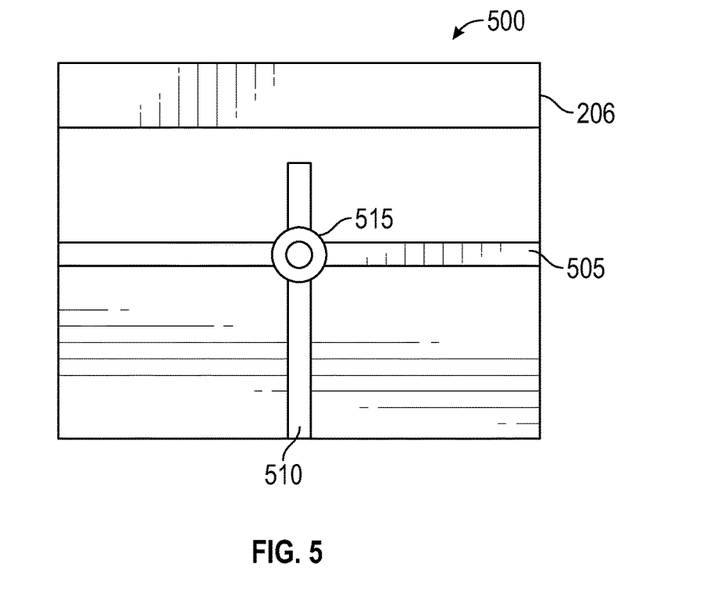
FIG. 5 is a rear view of the removable mount detached from the mounting device, according to an embodiment of the present invention.

FIG. 5 depicts a rear view of removable mount 500 detached from the mounting device 100 and stationary support plate 205. Removable mount 500 can include horizontal slotted rail guide 505 and slotted vertical rail guide 510. Screw hole 515 can be used to mount to support plate 205. Carry handle 206 can be used to manipulate removable mount 500.

Figure 6:
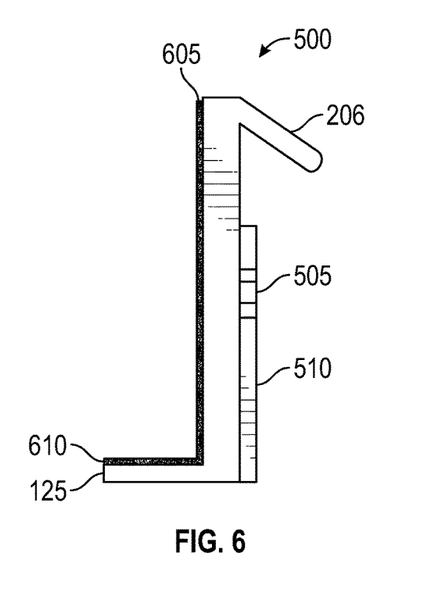
FIG. 6 is a left side view of the removable mount, according to an embodiment of the present invention.

FIG. 6 depicts a right side view of removable mount 500 detached from the mounting device 100 and stationary support plate 205. Removable mount 500 can include horizontal slotted rail guide 505 and slotted vertical rail guide 510. Screw hole 515 can be used to mount to support plate 205. Carry handle 206 can be used to manipulate removable mount 500. Velcro® 605 can cover the front surface of removable mount 500 to use to secure mobile device to removable mount 500, and bottom shelf 125 can include a layer of felt 610 to cushion and protect the mobile device.

Figure 7:
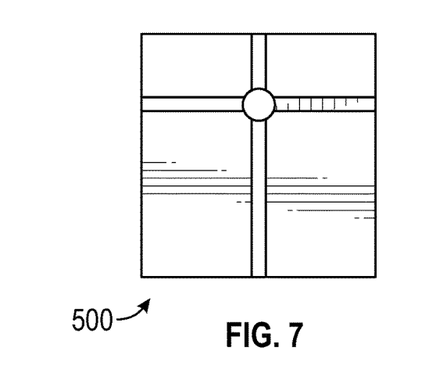
FIG. 7 is a front side view of the removable mount, according to an embodiment of the present invention

FIG. 7 shows a front side view of the removable mount 500. Front surface 710 can be include vertical flat and as noted above is covered by the hook portion of a hook-and-loop material, such as Velcrow®. Front surface 710 can also include horizontal rail guide slots 505 and vertical guide slots 510.

Figure 8:
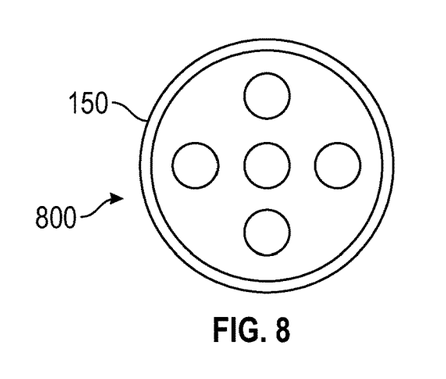
FIG. 8 is a top view of the pivot dial used in the mounting device, according to an embodiment of the present invention.

FIG. 8 is a top view of the pivot dial 800. Pivot dial 150 can comprise a circular metal disk.

Figure 9:
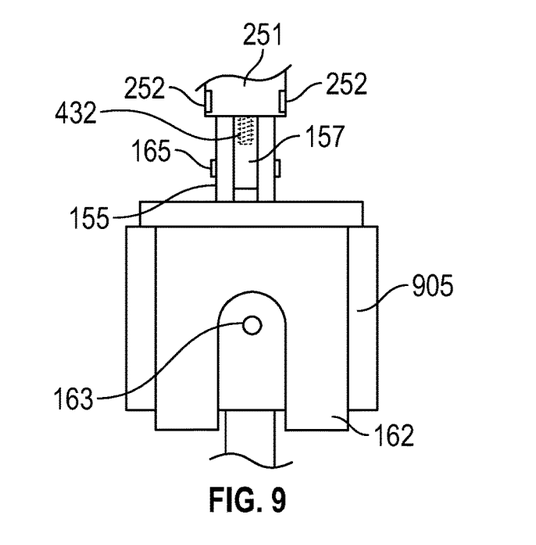
FIG. 9 is a front view of the attaching clamp, according to an embodiment of the present invention

FIG. 9 is a front view of the attaching clamp 900. Vice clamp 162 can be used to fasten mounting device 100 to the top of a camera tripod 905. Vice clamp 162 can include a "U"-shaped slot 163 for connecting to the tripod 905. A hinge joint 165 can be interposed between the stationary round rod 155 and base 160 and can include a square terminus 157 forming a pivot.

The interior of at the telescoping inner square rod 145 at the connection to hinge joint 156 can include a steel mounting bracket secured to the telescoping inner square rod 145 and hinge joint 156 by countersunk screws 432. Round locking collar 251 can include spring clip 252 to secure round locking collar 251 in place.

Figure 10:
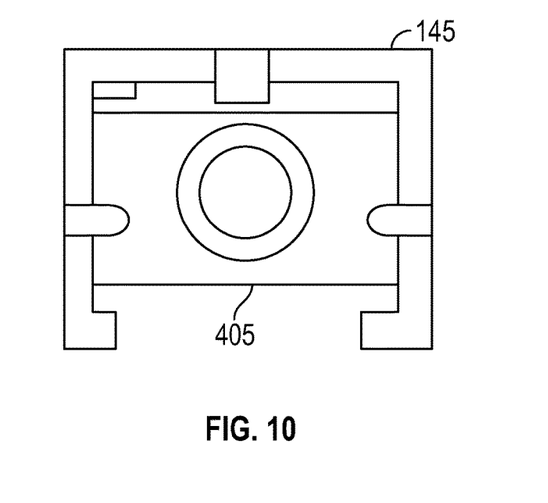
FIG. 10 is a top cross-section view of the square rod showing the telescoping brace rod in stowed position, according to an embodiment of the present invention

FIG. 10 is a top cross-section view of the square rod 145. In an embodiment, square rod 145 includes an open side 1005 housing telescoping showing the telescoping brace rod 405 in a stowed position.

Figure 11:
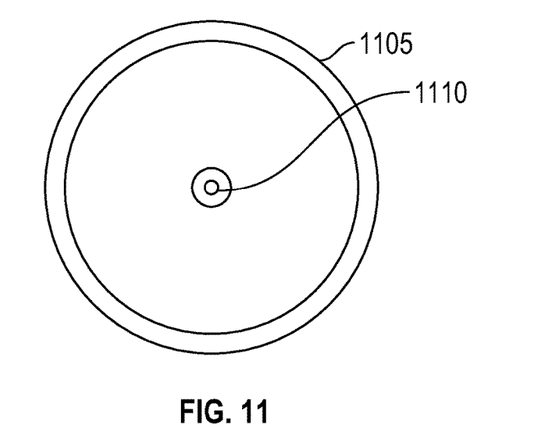
FIG. 11 is a top view of the socket showing spring loaded ball bearing, according to an embodiment of the present invention.
Figure 12:
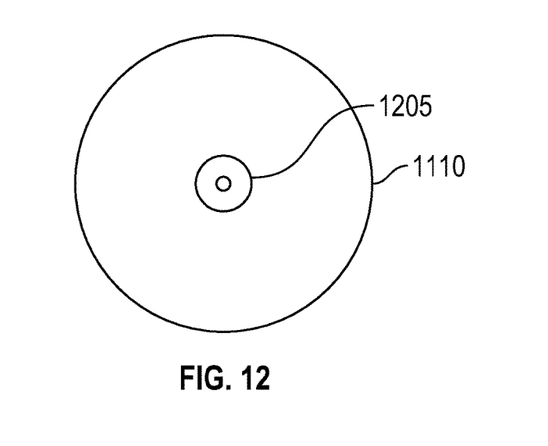
FIG. 12 is a bottom view of the ball bearing showing center dimple, according to an embodiment of the present invention.

FIG. 11 is a top view of the socket 1100 showing spring loaded ball bearing. The socket 1110 of ball and socket joint 130 can further spring-loaded ball bearing 1110 at the base of the socket. FIG. 12 shows a bottom view of the ball bearing 1110 in an embodiment, with dimple 1205 on the bottom of the ball bearing 1110 to automatically align the ball and socket joint 130 in a 90° orientation of the mounting device 100.

Figure 13:
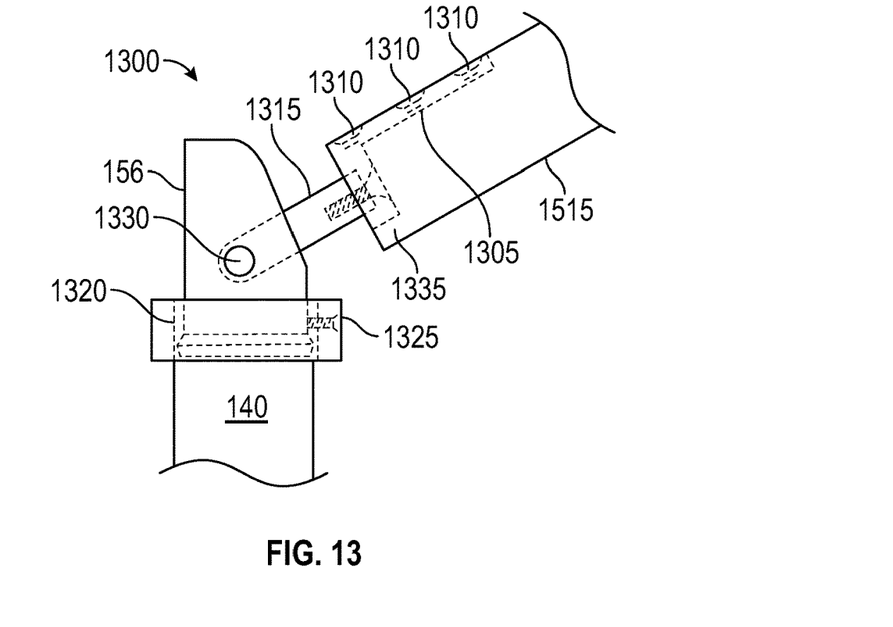
FIG. 13 is an isolated view of the rotating elbow joint of the mounting device, according to an embodiment of the present invention.

FIG. 13 is an isolated view of the rotating hinge joint assembly 1300 of the mounting device 100. Hinge joint 156 can include hinge pin 1330 securing connecting rod 1315, which together form the pivot point of hinge joint 156. Connecting rod 1315 can be secured to telescoping inner square rod 145 using a reinforcing bracket 1305 attached to the telescoping inner square rod 145 using countersunk screws 1305, one of which is screwed down into the center of connecting rod 1315. Connecting rod 1315 can rotated through a 90° arc from vertical. A recess 1335 in the connection to inner square rod 145 can accommodate a stop screw 1325. Stop screw 1325 can also pass through hinge joint 156.

Telescoping inner square rod 145 can slide up and down inside square outer rod 140 and can be locked in place by locking collar 141, which can engage the hinge base 1320 to lock the hinge joint 156 in place. When the telescoping inner square rod 145 is rotated into a vertical 0° orientation, locking collar 141 can disengage the hinge joint 156 to allow telescoping inner square rod 145 to move down within square outer rod 140.

Figure 14:
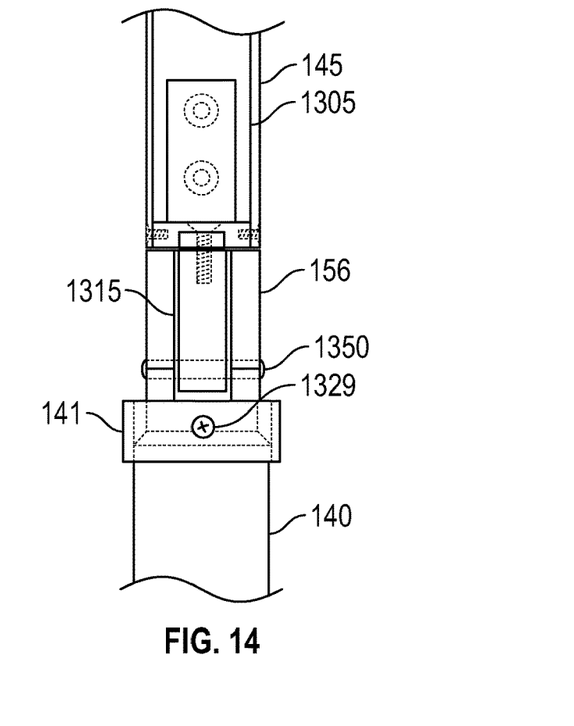
FIG. 14 is an isolated front view of the rotating elbow joint of the mounting device, according to an embodiment of the present invention.

FIG. 14 is an isolated front view of the rotating hinge joint assembly 1300 of the mounting device 100. Hinge joint 156 can include hinge pin 1330 securing connecting rod 1315, which together form the pivot point of hinge joint 156. Connecting rod 1315 can be secured to telescoping inner square rod 145 using a reinforcing bracket 1305 attached to the telescoping inner square rod 145. The reinforcing bracket 1305 can be constructed from steel with the telescoping inner square rod 145 constructed from aluminum. A stop screw 1325 can also pass through hinge joint 156 and help support inner square rod 145 when rotated to 90°.

Telescoping inner square rod 145 can slide up and down inside square outer rod 140 and can be locked in place by locking collar 141, which can engage the base of inner square rod 145, locking the hinge joint 156 in place vertically. When the telescoping inner square rod 145 is rotated into a vertical 0° orientation, locking collar 141 can disengage the hinge joint 156 to allow telescoping inner square rod 145 to move down within square outer rod 140.

Figure 15:
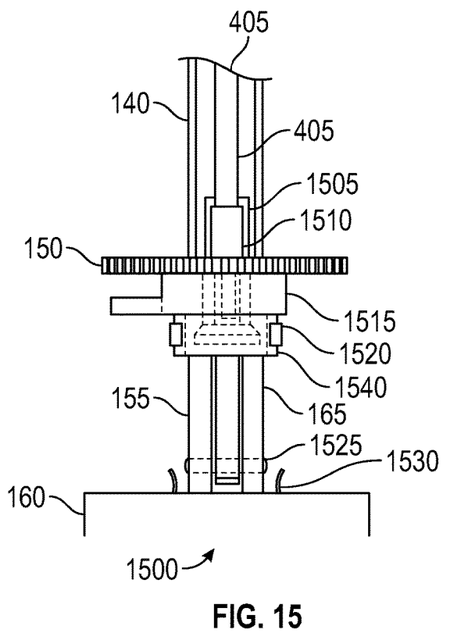
FIG. 15 is an isolated side view of the pivot mechanism, according to an embodiment of the present invention.

FIG. 15 depicts an isolated side view of the pivot mechanism assembly 1500 according to an embodiment. Square outer rod 140 can accommodate telescoping brace rod 405. Telescoping brace rod 405 can fit into steel plate 1505 when in a stowed configuration; the steel plate comprising the upper portion of a pivot mechanism. Magnetized twist lock 1510 can secure telescoping brace rod 405 in place. Threaded lock 1515 can interface with pivot dial 150 to lock in place. Spring clips 1520 can further provide a friction force to further secure threaded lock 1515 in place. Round tube 1540 can further have internal threads for locking the pivot dial 150. Stationary round rod 155 can include a base hinge 165 in can allow mounting device 100 to rotate 90°. Spring clips 1530 can aid in stabilizing, securing, and holding mounting device 100 when rotated into a 90° configuration.

Figure 16:
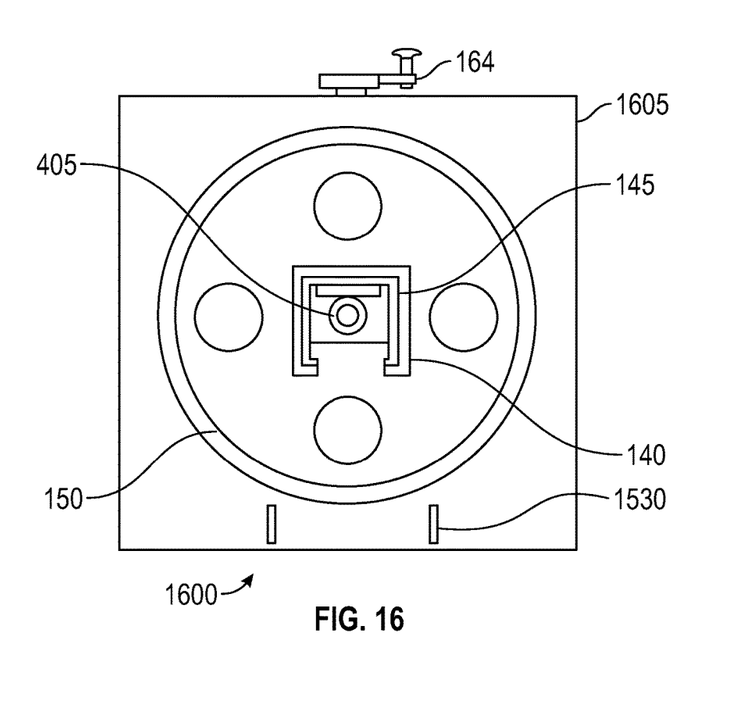
FIG. 16 is an isolated top view of the pivot mechanism, according to an embodiment of the present invention.

FIG. 16 is an isolated cross-sectional top view of the pivot mechanism 1600 according to an embodiment. Pivot dial 150 facilitates rotation of the mounting device 100. Square outer rod 140 comprises an outermost rod of the mounting device 100, which can house telescoping inner square rod 145, which in turn can house telescoping brace rod 405. Swivel crank can operate movable vice clamp 371. Spring clips 1530 can act to stabilize, secure, and hold mounting device 100 when rotated into a 90° configuration.

This device is adapted to multiple uses for use with smartphones, tablets, iPads, digital cameras, film cameras, and small and medium format cameras. The device can be used by itself or in conjunction with a tripod. It can be used in photography or as a digital video camera in digital videography or viewing/monitoring.

There are two basic configuration for use with a tripod. First, the entire device can be can be attached to a tripod. Second, the detachable upper mount piece that can accommodate a smartphone or tablet can be attached to the tripod. Using the detachable mount, the device can be used with a SLR type camera alone or with a smartphone or tablet attached to the tripod. The device can be used for long distance selfie with use of time delay activation. The device can also be used for copy work, flat, or 3D. Further, it can be easily attached to a table, desk, or chair. Unlike other such devices, this mount device does not obscure the view screen of the smartphone or tablet with clamps, clips, or other moving parts. The mount device does not use any moving parts to secure a smartphone or tablet. The mount device can be used to set an orientation at 0° sitting upright vertically or can be set at a 90° right angle from vertical or angles for a given desired orientation.

Stability=High Resolution

Today's technology incorporates pixel resolution in the millions and reduces the relative size to an extent that the pixel sizes exhibit smaller resolution than silver halide crystal grains used in film photography. The current resolution of digital cameras exhibits superior quality, or at least comparable quality, to film. Given its comparative quality, the ease of digital photography has proven a significant draw to budding photographers, and more people take pictures on a routine basis than in the past. However, there are fewer technology options for holding and supporting smartphones, tablets, and similar devices compared to conventional cameras. Portrait photography, copy work, flat, or 3D photography requires a completely stable platform, which the invention provides.

Many unique features have been incorporated into the mount device including a telescoping brace rod within a telescoping hinged inner rod to use in very steady copy work to achieve the highest quality photograph out of the mobile device. The mount device can be used for long distance selfies with use of a shutter delay feature and by using the built-in camera of a mobile device with its higher pixel resolution.

Among the features of the mount device is a removable mounting to accommodate a wide variety of mobile devices including smartphones, tablets, and iPads that comprises an open ended shelf on the bottom of the removable mount that can accommodate a wide size range of mobile devices. The removable mount can be separately attached to a tripod or left on the mount device and the whole device mounted to a tripod. The mount device can also be attached to a table, chair, shelf, bookcase, or the like. All mobile devices can be attached by Velcro to the removable device, so no moving parts can obscure the screen or camera lens. A ¼" diameter retaining bolt on the mount device is essentially identical to a retaining bolt found on most tripods and possesses a 20 per inch thread count, which is a standard thread count found on tripod retaining bolts. Alternatively, a ⅜" retaining bolt with a 16 per inch thread count can be utilized. An adapter can be used to connect the two bolt standards together.

Rather than used for photography or as a camera, the mount device can be used to position the mobile device to watch a video multi-media program on the device such as a movie or TV. The mount device can also incorporate components to position the mount device at 90° or other angles.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A mounting device to support and secure a mobile device incorporating a high pixel count camera, comprising:
    a mounting device comprised of a first rod secured to a support plate, with the first rod connected to a ball and socket joint constructed to rotate the mounting device into at least a 90° configuration, the ball and socket joint connected to a second rod interposed between the ball and socket joint and a pivot mechanism comprising a pivot dial facilitating pivoting around a vertical axis, and terminating in a vice clamp opposed to the support plate, with a third rod interposed between the pivot mechanism and the vice clamp;
    a locking lever that operates a magnetized twist lock, which locks the pivot dial in place such that everything below the pivot dial remains stationary; and
    a removable mount to receive a mobile device having an integrated high pixel count camera and camera lens, the removable mount securing the mobile device so as to leave the camera lens unobstructed.

2. The mounting device of claim 1, wherein the second rod further comprises a telescoping inner rod.

3. The mounting device of claim 2, wherein the second rod further comprises a telescoping inner rod housing a telescoping brace rod constructed to brace the mounting device when the ball and socket joint is rotated from a 0° vertical configuration, the telescoping brace rod rotating outward for use.

4. The mounting device of claim 3, wherein the telescoping brace rod further comprises:
    a pivot joint at a first end proximate to the ball and socket joint secured to the interior of telescoping inner rod, and a rubber tip at a second end; and
    said rubber tip fitting into at least one slot in the second rod to brace the mounting device when in a 90° configuration.

5. The mounting device of claim 1, wherein the ball and socket joint facilitates a 90° configuration of the mounting device.

6. The mounting device of claim 1, further comprising:
    a hinge joint on the third rod interposed between pivot mechanism and the vice clamp; and
    wherein said hinge joint facilitates rotating the mounting device up to 90° and further comprises a hinge stop.

7. The mounting device of claim 1, wherein the ball and socket joint further comprises a spring-loaded ball bearing and dimple constructed to align the mounting device in a 90° configuration.

8. The mounting device of claim 1, wherein the third rod interior is configured to accommodate a hinge joint located at a distal end of the telescoping inner rod when in a retracted configuration, wherein the telescoping inner rod in an extended configuration can extend outward from the second rod to rotate on then exposed said hinge joint to configure the mounting device in a 90° configuration.

9. The mounting device of claim 8, wherein the telescoping brace rod fits into the telescoping inner rod in a retracted configuration, with the hinge joint fitting inside the telescoping inner rod.

10. The mounting device of claim 1, wherein said removable mount comprises a flat surface at least partially covered by a hook portion of a hook-and-loop fastener; and a felt-covered shelf bottom constructed to support said mobile device.

* * * * *